T. A. FREEMAN & W. R. WILLIAMS.
WHEELED PLOW.
APPLICATION FILED APR. 6, 1912.
1,069,407.
Patented Aug. 5, 1913.
3 SHEETS—SHEET 1.
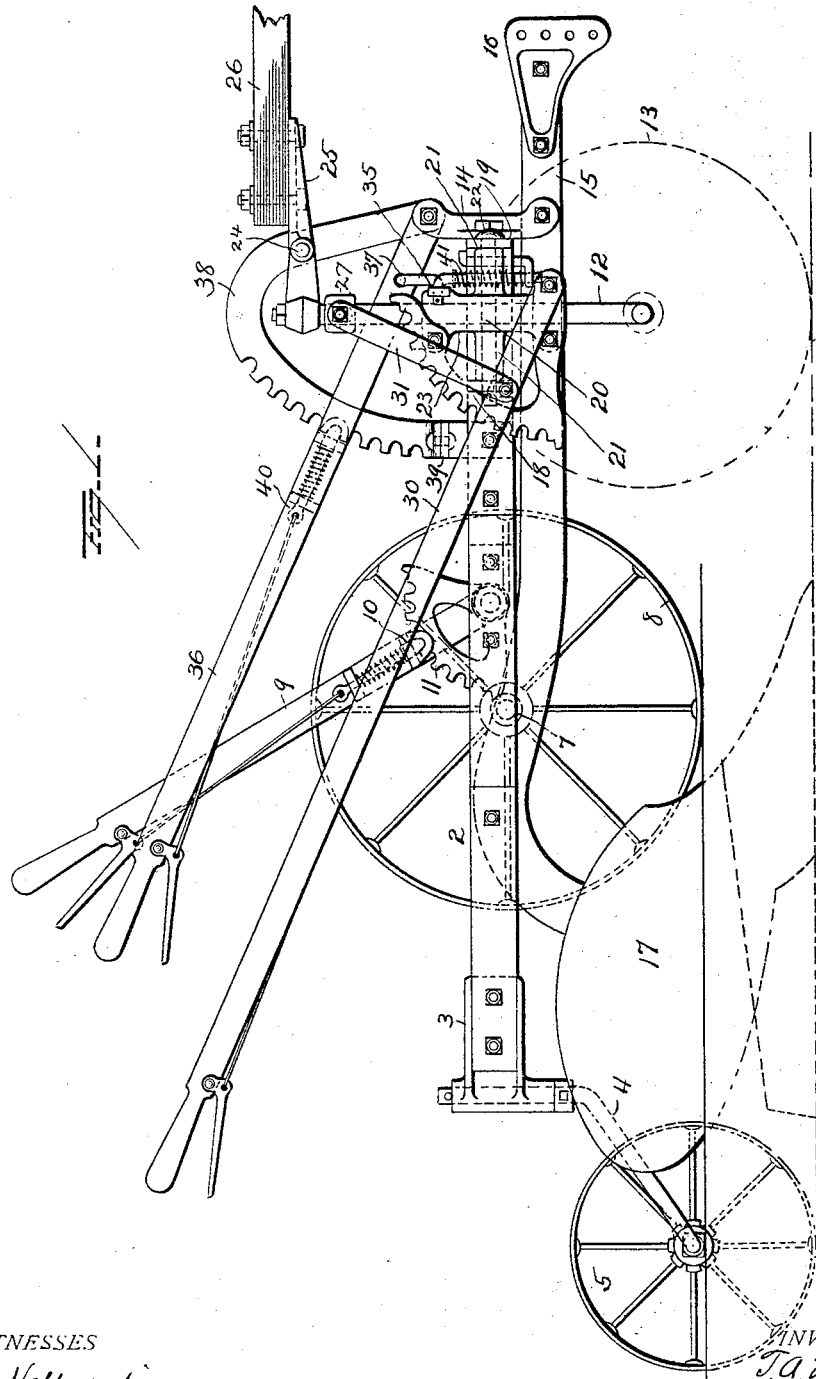

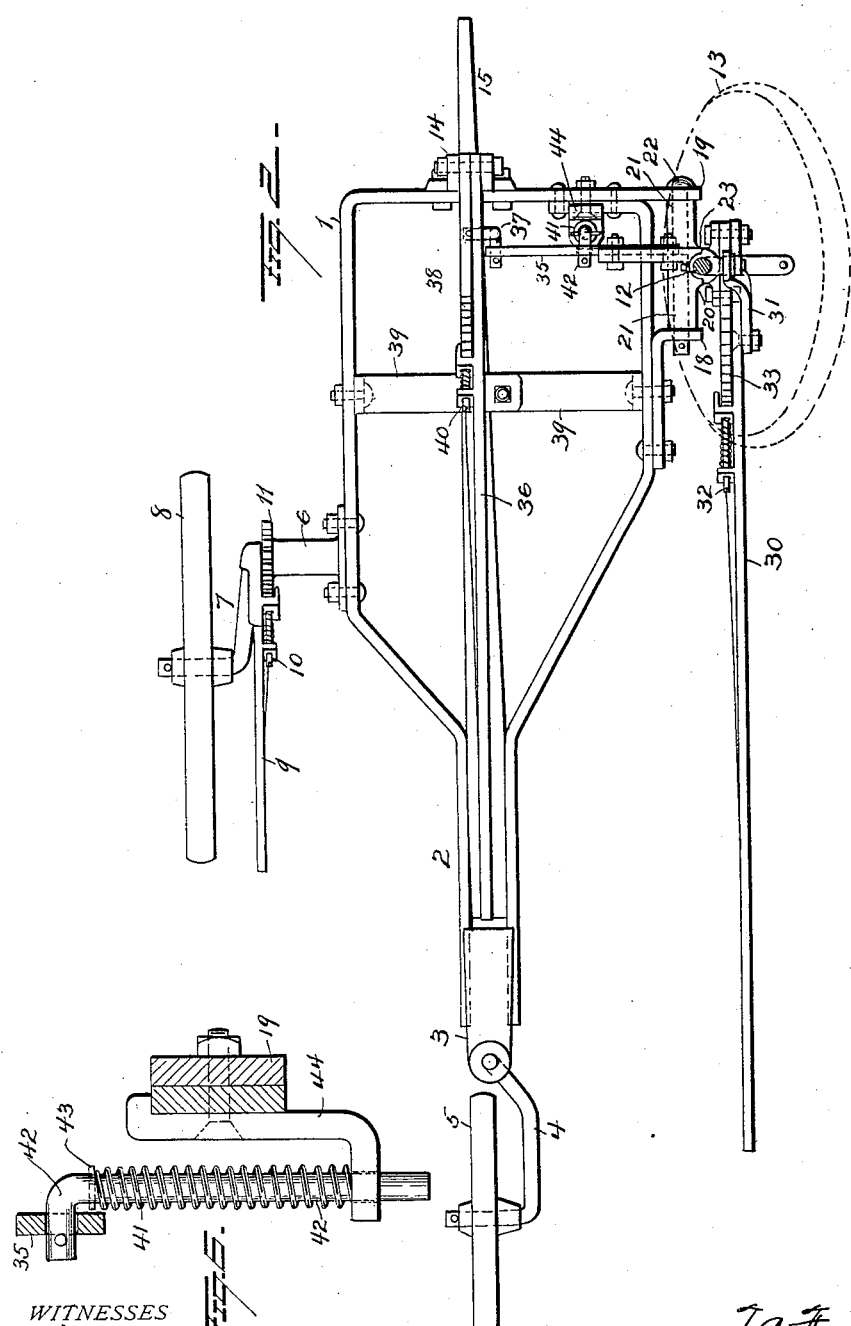

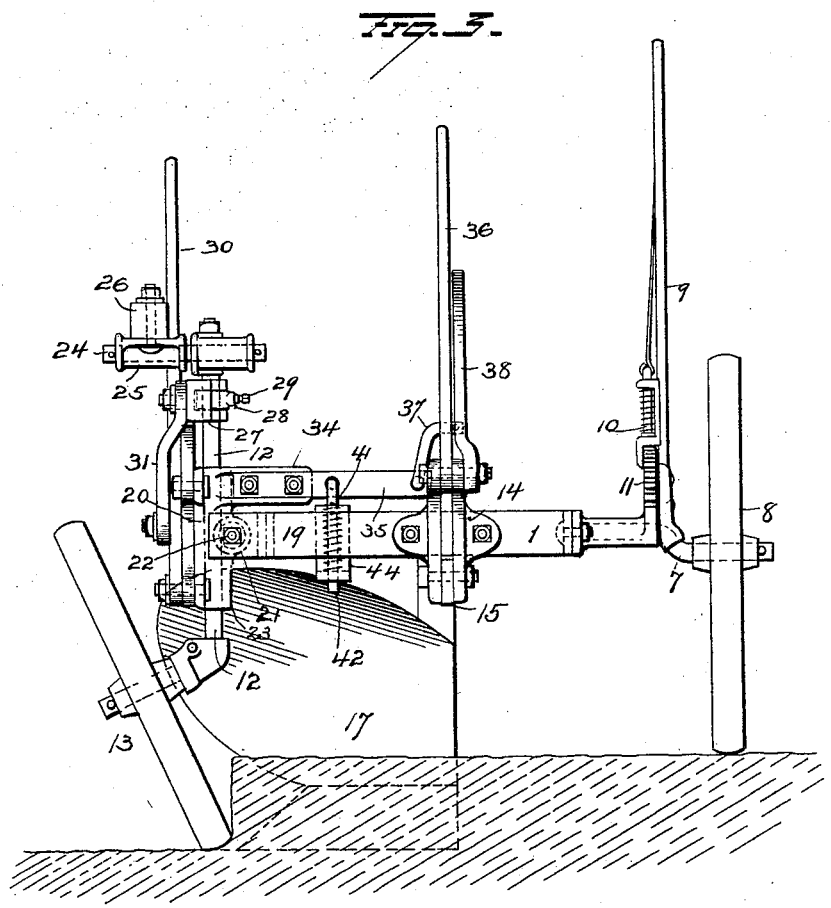
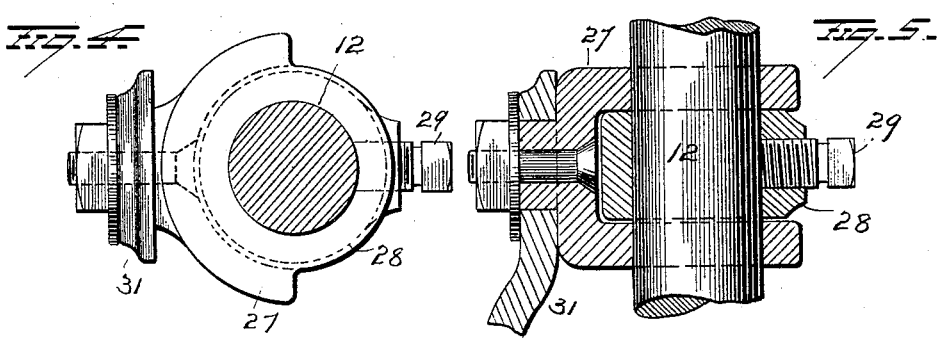

UNITED STATES PATENT OFFICE.

THOMAS A. FREEMAN AND WILLIAM R. WILLIAMS, OF SOUTH BEND, INDIANA, ASSIGNORS TO OLIVER CHILLED PLOW WORKS, OF SOUTH BEND, INDIANA.

WHEELED PLOW.

1,069,407.  Specification of Letters Patent.  Patented Aug. 5, 1913.

Application filed April 6, 1912. Serial No. 689,009.

*To all whom it may concern:*

Be it known that we, THOMAS A. FREEMAN and WILLIAM R. WILLIAMS, citizens of the United States, residing at South Bend, in the county of St. Joseph and State of Indiana, have invented certain new and useful Improvements in Wheeled Plows; and we do hereby declare the following to be a full, clear, and exact description of the invention, such as will enable others skilled in the art to which it appertains to make and use the same.

This invention relates to improvements in wheeled plows,—one object of the invention being to provide simple and efficient means for narrowing and widening the furrow.

A further object is to provide novel means for swinging the forward furrow wheel laterally with respect to the plow body or soil engaging part.

A further object is to so connect a spring with the lever by means of which the furrow wheel is swung or adjusted laterally, that the load of the frame on the lever will be offset when the wheel is adjusted outwardly or to a wide position.

With these and other objects in view, the invention consists in certain novel features of construction and combinations of parts as hereinafter set forth and pointed out in the claims.

In the accompanying drawing; Figure 1 is a side elevation of a plow showing an embodiment of our invention; Fig. 2 is a plan view; Fig. 3 is a front view, and Figs. 4, 5, and 6 are views illustrating details.

1 represents a frame, to the narrow rearwardly projecting part 2 of which, a bracket 3 is secured for the accommodation of the swiveled axle 4 of a trailing caster wheel 5. A bracket 6 is secured to and projects laterally from one side of the frame 1, and in this bracket, the cranked-axle 7 of a land-wheel 8 is mounted. A lifting lever 9 is secured to this cranked axle and provided with a detent 10 to coöperate with a toothed segment 11 on the bracket 6. At the opposite side of the frame 1, and in advance of the bracket 6 and land wheel 8, devices are provided (as will be hereinafter described) for supporting and permitting the manipulation or adjustment of the vertical cranked standard-axle 12 of a furrow wheel 13.

A bifurcated bracket 14 is rigidly secured to the forward cross bar of the frame 1 and projects both above and below said cross bar. To the depending portion of this bracket, a plow beam 15 is pivotally attached at a point rearwardly of its forward end; to which latter, a suitable clevis 16 is secured. The plow beam extends rearwardly a suitable distance and is provided at its rear end with a plow body 17 of any preferred construction.

Arms 18—19 project laterally from the forward portion of the frame 1, and between these arms, a bracket 20 is disposed. This bracket comprises a horizontal sleeve or tubular portion 21 for the accommodation of a horizontal pin or rod 22 which serves to pivotally connect said bracket with the arms 18—19 of frame 1 and a vertical sleeve or tubular portion 23, through which the standard-axle 12 of the furrow wheel 13 passes. The standard axle extends some distance above the pivoted bracket and to its upper end, a laterally projecting arm 24 is rigidly secured for the accommodation of a suitable bracket 25 to which the pole 26 is secured. It is apparent that lateral movement of the pole will cause a rotary movement of the standard axle and a change in the angularity of the furrow wheel at the cranked lower end of said axle.

A coupling yoke 27 is mounted loosely on the standard axle (near the upper end thereof) and is prevented from vertical movement thereon, by means of a collar 28 secured by a set screw 29 to the axle 12 between the parallel members of said coupling yoke. A lever 30, is pivoted at its forward end forwardly of the standard axle (preferably to the lower portion of the bracket 20) and this lever is connected, by means of a link 31, with the coupling yoke 27. A suitable detent 32 is provided on the lever 30 and coöperates with a toothed segment 33, which latter may also be secured to the bracket 20. By means of the lever 30, the standard axle and furrow wheel can be raised or lowered and locked at any desired adjustment.

The vertical tubular portion 23 of the bracket 20 is provided at its upper end with an inwardly projecting part 34, to which an arm or lever 35 is secured, and a hand lever 36 has a pivotal connection at its forward end with the frame in advance of the standard axle and its supporting bracket. A bent link 37 connects the hand lever 36 with the arm or lever 35 so that when said hand lever is operated, motion will be transmitted to the bracket 20 to move it on its pivotal support and turn the standard axle in a manner to swing the furrow wheel laterally in an outward or an inward direction.

The pivotal support for the forward end of the hand lever may, as shown in the drawing, be at the upper end of the bracket 14 at the forward end of the frame 1. One end of a toothed segment 38 is secured to the bracket 14 and the other end of this segment is secured to a cross bar 39 of the frame 1. A detent 40 is provided on the lever 36 for coöperation with the segment to lock said lever and the standard axle and furrow wheel at any desired adjustment.

In order that the load of the frame on the lever 36 shall be offset when the furrow wheel is adjusted to a wide position, (as when said wheel moves away from under the pivotal support of the bracket 20,) a spring 41 is employed. This spring encircles a rod 42 loosely attached at its upper end to the arm 35. The upper end of the spring bears against a pin 43 passing through said rod and the lower end bears against a bracket 44 secured to the frame 1; through which bracket, the lower portion of said rod freely passes.

With plows of the type to which our invention relates the hitch is adjusted so that the front furrow wheel tends to hug the bank of the furrow, so that the swinging of the team does not easily draw the plow to reduce the width of the cut. With our improvements, the width can be easily changed by shifting the furrow wheel laterally through the medium of the swinging pivotal support for the standard axle of said wheel, and the lever 36 with the connections between said lever and the pivoted bracket.

Various slight changes might be made in the details of construction of our invention without departing from the spirit thereof or limiting its scope and hence we do not wish to restrict ourselves to the exact details herein set forth.

Having fully described our invention what we claim as new and desire to secure by Letters-Patent, is:—

1. In a wheeled plow, the combination with a frame, a plow and land and furrow wheels, of an upright bracket pivotally mounted on the frame to move outwardly and inwardly in a plane at right angles thereto, a standard axle for the furrow wheel mounted in said pivoted bracket, an arm projecting inwardly from said pivoted bracket, an operating lever on the frame, a link connecting said operating lever with the inwardly projecting arm on the bracket, and a spring connection between said inwardly projecting arm and the frame to offset the load when the bracket is swung to move the furrow wheel outwardly, and means for locking the operating lever.

2. In a wheeled plow, the combination with a frame, a plow, and land and furrow wheels, of a bracket pivotally mounted on the frame to swing laterally with respect to the frame, a standard axle having a mounting in said bracket and provided at its lower end with a crank mounted in the hub of the furrow wheel, an arm projecting inwardly from said bracket, a hand lever, a link connecting said hand lever with the arm on the bracket, means for locking the hand lever, a fixed bracket on the frame, a rod loosely connected with the arm on the pivoted bracket and passing freely through a hole in said fixed bracket, a spring on said rod having a bearing at one end on said fixed bracket, and a fixed bearing on said rod for the other end of said spring.

In testimony whereof, we have signed this specification in the presence of two subscribing witnesses.

THOMAS A. FREEMAN.
WILLIAM R. WILLIAMS.

Witnesses:
WILLIAM L. PAUL,
EDWIN NICAR.

---

Copies of this patent may be obtained for five cents each, by addressing the "Commissioner of Patents, Washington, D. C."